United States Patent Office.

HARRY M. TURK, OF NEW YORK, N. Y., (ANCILLARY ADMINISTRATOR OF JULES HENRI DU VIVIER, DECEASED,) ASSIGNOR TO THE SOCIÉTÉ ANONYME DE LA SOIE FRANCAISE, OF PARIS, FRANCE.

COMPOSITION OF MATTER FOR MANUFACTURING ARTIFICIAL SILK.

SPECIFICATION forming part of Letters Patent No. 563,214, dated June 30, 1896.

Application filed November 9, 1895. Serial No. 568,488. (No specimens.) Patented in France January 26, 1889, No. 195,655; in Belgium January 26, 1889, No. 84,774; in England February 13, 1889, No. 2,570; in Spain April 2, 1889, No. 9,204; in Italy May 30, 1889, LXIX, 356, and in Germany August 28, 1890, No. 52,977.

*To all whom it may concern:*

Be it known that JULES HENRI DU VIVIER, deceased, late of the city of Nanterre, near Paris, France, did invent an Improved Composition of Matter for the Manufacture of Artificial Silk, (for which Letters Patent have been obtained in France, No. 195,655, dated January 26, 1889; in Belgium, No. 84,774, dated January 26, 1889; in England, No. 2,570, dated February 13, 1889; in Spain, No. 9,204, dated April 2, 1889; in Italy, No. 356, Vol. LXIX, dated May 30, 1889, and in Germany, No. 52,977, dated August 28, 1890,) of which the following is a full, clear, and exact description.

This invention relates to a composition from which threads may be produced presenting the appearance and possessing the properties of silk filaments obtained from cocoons.

The composition consists of nitrocellulose, ninety-six parts; gelatin or isinglass, two parts; albumen, two parts; total, one hundred parts, dissolved in sixteen hundred parts of glacial acetic acid.

The nitrocellulose and gelatin are soluble in acetic acid, and mixed therewith. Albumen, however, is not soluble in acetic acid, and for the treatment thereof proceed as follows: To the aqueous solution of albumen is added slightly-carbonated soda, the proportions which have been found most suitable being thirty-five parts by weight of soda to one hundred parts of solid albumen, although these proportions may be varied according to circumstances. The mixture thus obtained is then desiccated as completely as is possible at a temperature slightly below 20° centigrade, which must not be exceeded, in order to avoid the production, even partially, of insoluble albumen. As the desiccated product is always slightly deliquescent, it should be prepared only in quantity required for immediate use, in which condition it is added to the other ingredients named. If employed at once or within two or three days of its preparation, the acetic acid easily and quickly dissolves the albumen, acetate of soda being also produced and a slight evolution of carbonic acid.

The viscous or semifluid matter formed by the composition above specified constitutes the base of the artificial silk of this invention and may be formed into threads by expressing it under water through a small orifice. In order to impart to the threads so obtained the strength and appearance of real silk, as well as a certain degree of incombustibility, they are subjected to the action of various chemical agents. To this end the thread immediately on its formation is carried through a coagulating-bath composed of an alkaline solution, preferably bisulfite of soda, the thread collected in hanks being afterward denitrated by any suitable process.

The composition may also be formed into slabs or sheets, which may be used for any suitable purpose.

What is claimed is—

A composition of matter for the manufacture of artificial silk, consisting of nitrocellulose, gelatin, albumen and acetic acid in about the proportions specified.

HARRY M. TURK,
*As Ancillary Administrator of the Estate of Jules Henri Du Vivier.*

Witnesses:
GEO. E. MORSE,
MAURICE BLOCK.